Figure 1:
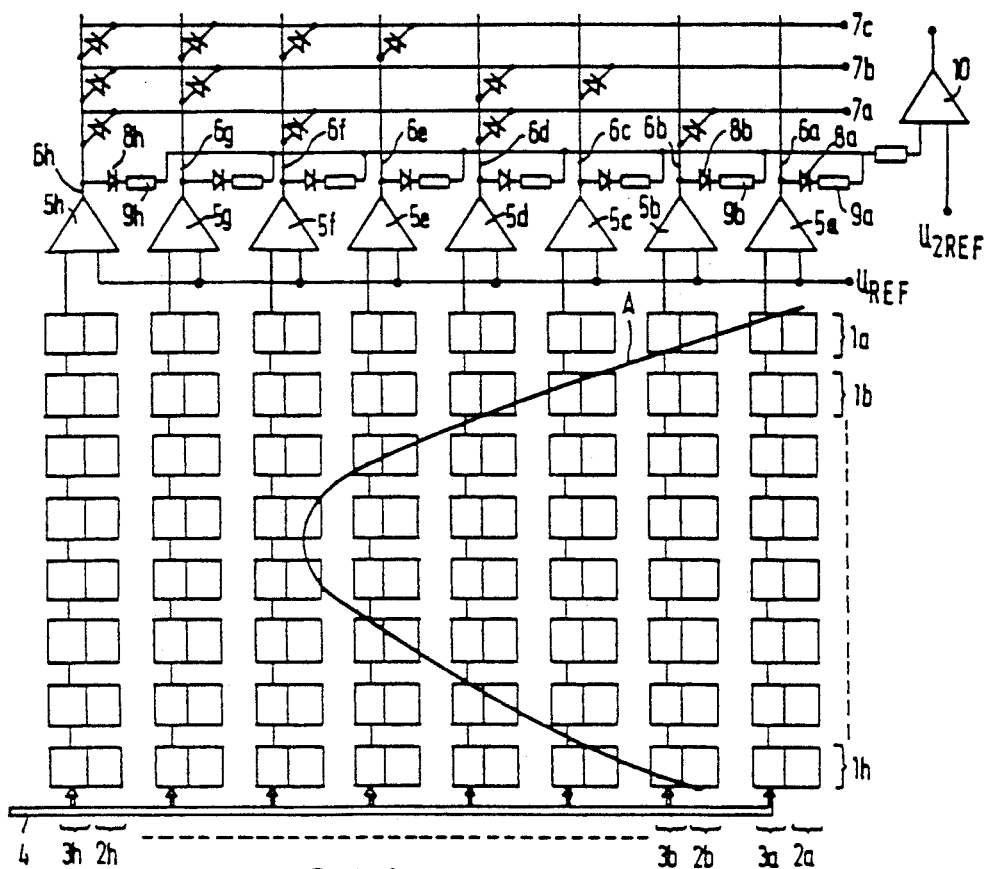

United States Patent [19]

Oomen

[11] Patent Number: 5,210,402
[45] Date of Patent: May 11, 1993

[54] DETECTION SYSTEM FOR A RADIATION PROFILE LINE

[75] Inventor: Gijsbert L. Oomen, Pijnacker, Netherlands

[73] Assignee: B.V. Optische Industies "De Oude Delft", Oldelft, Netherlands

[21] Appl. No.: 458,703

[22] PCT Filed: Jul. 7, 1988

[86] PCT No.: PCT/EP88/00620
§ 371 Date: Feb. 14, 1990
§ 102(e) Date: Feb. 14, 1990

[87] PCT Pub. No.: WO89/01129
PCT Pub. Date: Feb. 9, 1989

[30] Foreign Application Priority Data

Aug. 5, 1987 [NL] Netherlands ............... 8701847

[51] Int. Cl.⁵ .............................................. H01J 40/14
[52] U.S. Cl. .................................... 250/208.3; 250/561
[58] Field of Search ............... 250/208.1, 208.2, 208.3, 250/561, 206.1, 206.2; 356/376, 381

[56] References Cited

U.S. PATENT DOCUMENTS

| | | | |
|---|---|---|---|
| 3,894,230 | 7/1975 | Rorden et al. | 250/208.2 |
| 4,093,866 | 6/1978 | Kasdan et al. | 250/208.3 |
| 4,547,676 | 10/1985 | Suzuki et al. | 250/208.3 |

Primary Examiner—David C. Nelms
Attorney, Agent, or Firm—Louis E. Marn

[57] ABSTRACT

A radiation profile line originates from illuminating a scene by a fan beam of radiation and imaging the thus illuminated scene on a surface of an array of photosensitive elements. A read-out circuit has inputs connected to associated detection elements in the uppermost row. The read-out circuit comprises level detector circuitry to have the output signals of the columns take up either a "1" state or a "0" state. The outputs of the level detector curcuitry, each one of which corresponds to one of the inputs, are connected to a circuit that delivers a digital code representative of the position of the element in the uppermost row which has received the largest amount of light.

9 Claims, 1 Drawing Sheet

DETECTION SYSTEM FOR A RADIATION PROFILE LINE

The invention relates to a detection system for a radiation profile line comprising a matrix containing M rows and N columns of photosensitive detection elements, means for shifting the output signals of the detection elements row by row in the column direction under the control of clock signals, and a read-out circuit, of which one input is always connected to an associated detection element in the Mth row of detection elements.

Systems for observing radiation profile lines are used, inter alia, in triangulation measurements in which a profile is illuminated with a fan-shaped light beam at a first angle while the illuminated profile is observed from a second angle, differing from the first, by means of a detection system. The profile line observed in this manner makes it possible to calculate absolute distances in the profile.

For observing the profile line, use may be made of a detection system consisting of a television camera or of a two-dimensional detector containing a matrix of rows and columns of photosensitive elements. A drawback of a television camera and of the existing two-dimensional detectors is that the picture elements or detection elements have to be read out serially line by line or row by row, which limits the number of profiles which can be observed per second to the normal raster speed. In this manner, M×N read-outs are necessary per read-out cycle with a matrix of M×N photosensitive elements.

The Dutch patent application 8500600 provides for a detection system in which this problem is recognized. According to said patent application, a solution for this problem is presented by not making use of columns of photosensitive detection elements but of a number of so-called "position sensitive devices" (PSD) placed parallel to each other in columns; such a PSD provides an output signal which is a measure of the position on the PSD where light radiation is incident upon the latter. Said output signal is determined by means of a sub-calculation. Although it is possible with said known detection system in the case of N PSDs, to obtain the complete information relating to the variation of the profile line by means of N consecutive read-outs, namely one per PSD, the use of PSDs also has a number of drawbacks. In the first place, the sub-calculations needed at higher frequencies are difficult to implement and/or can be implemented only at high costs due to the complex electronics required. In the second place, the output signal of a PSD contains a quantity of thermal noise due to the construction of such a PSD. In order to obtain a sufficiently high signal/noise ratio despite said thermal noise, it is necessary to employ high light levels in order that a sufficient quantity of light reaches the detection system containing the PSDs. Furthermore, the required electronics for processing the signals from a PSD cannot be implemented or can be implemented only at very high costs if a reasonably high resolution and a reasonably high dynamic range are required.

The European patent application no. 0,181,553 also describes a detection system for a radiation profile line which is intended to make it possible to read out the observed profile line at high speed. For this purpose an observation system for a profile line is provided in which it is not an entire profile line generated by means of a fan-shaped beam which is observed by the detection system, but a profile line which is built up from consecutive light points projected by means of a narrow light beam on the profile to be observed. The light points reflected by the profile to be observed are imaged as a line via a cylindrical lens on the detection system which consists of a number, for example eight, of oblong detector elements. Each of said detector elements is masked in a manner such that consecutive elements deliver a binary coded signal. If the quantity of light received by such a masked detector element exceeds a certain threshold value, which is determined by means of a level detector connected to each detector element, this means that the output signal of the associated detector element is a logic "1". In this manner, the output signal of the detection system is available immediately in digital form so that the processing of said signals can take place at a very high speed. If the power of the laser source used to generate the narrow light beam is sufficiently high, a scanning speed of several MHz can be achieved with said known detection system.

Nevertheless, said known detection system also has a number of drawbacks. The required laser power has to be very high in order to obtain a sufficiently and evenly distributed illumination intensity on said elements during the spreading out of the reflected beam over the various oblong detector elements. If the light spot is incident on the detector element in a manner such that two adjacent detector elements both receive so much light that they both give a "1" output signal, the output signal obtained will also give a completely incorrect reproduction of the actual situation.

The object of the invention is to provide a detection system which does not have the drawbacks of the known systems so that, for example, no expensive electronics for sub-calculations and/or high laser powers are necessary, while it is nevertheless possible to observe profile lines with a speed which is at least equal to the speed at which profile lines can be observed with the known systems and no moving components are necessary, while, in addition, the object is to largely eliminate the possibility of incorrect measurement results.

For this purpose the invention provides a system of the above-mentioned type in which the read-out circuit comprises level detector circuitry coupled to the Mth detection element of each column and having N outputs each corresponding to a respective column and in which the outputs of the level detector circuitry are coupled to a circuit which can deliver a digital code which is representative of the position of the element in the Mth row which has received the largest amount of light.

The invention is based on the perception that in observing a profile line by means of a two-dimensional detection system, only one element in each row of detection elements receives light from the profile line to be observed, while the other detection elements receive no, or at least considerably less, light. Therefore, by determining, row by row, simultaneously for all detection elements in said row which element delivers an output signal which exceeds a certain threshold value, said element is indicated by means of a digital code and it is possible to determine, row by row, by means of said code which detection element in a row has received the largest amount of light, which is reflected by a sequential series of digital code signals. In this manner, the pattern of a profile line can be determined in a matrix containing M rows and N columns of detection elements by means of M read-outs instead of with M×N read-outs as in the case of the conventional detection systems.

Figure 2:
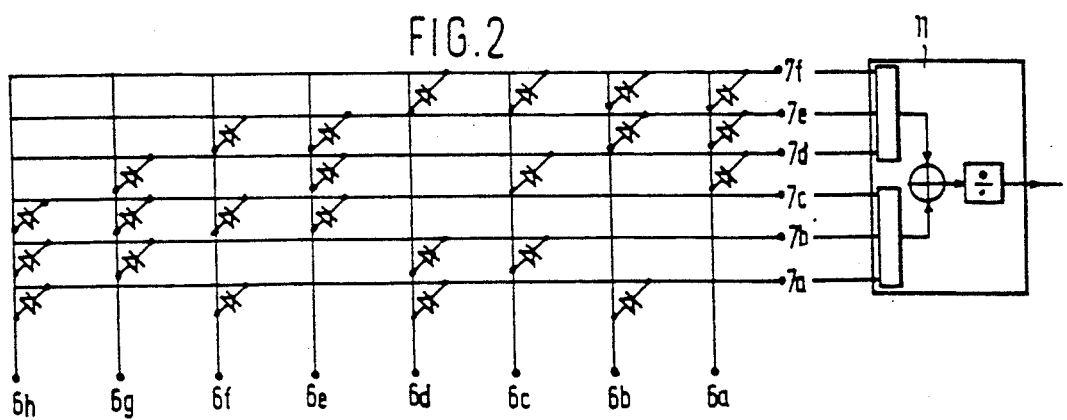

The invention will be explained in more detail below on the basis of an exemplary embodiment with reference to the drawing. In this:

FIG. 1 shows a diagrammatic representation of the detection system according to the invention; and FIG. 2 shows an extension of the system according to FIG. 1 for obtaining reliable measurement results if two photosensitive elements in one row receive an amount of light which is above the threshold value.

FIG. 1 shows diagrammatically the construction of a detection system for observing a radiation profile line. Although the principle of the invention is applicable to any matrix containing M rows (M=any integer) and N columns (N=any integer), the exemplary embodiment is described for the sake of clarity on the basis of a matrix containing eight rows and eight columns, attention being emphatically drawn to the fact that this is in no way to be seen as a restriction.

The system comprises eight rows, $1a$–$1h$ respectively, of photosensitive elements and eight columns, $2a$–$2h$ respectively, of photosensitive elements. The detection system therefore consists of $8 \times 8$ photosensitive elements. The signal from each of the eight photosensitive elements of a particular column can be transferred under the control of a read-out gate electrode to a vertical CCD shift register, $3a$–$3h$ respectively, associated with said column. Clock signals are fed in a manner known per se via a bus 4 to said shift registers $3a$–$3h$ and to the read-out gate electrodes. In the eighth row the last CCD element of the shift register of each column is coupled to a circuit, not shown, for converting the charge in said CCD element into a corresponding voltage in a manner known per se. The output signal of the charge/voltage converter associated with each column is coupled to a first input terminal of an associated level detector, $5a$–$5h$ respectively. Each level detector comprises a second input terminal, all the second input terminals being connected to each other and coupled to a reference voltage $U_{ref}$. The level detectors 5 are arranged in a manner known per se to deliver a "1" output signal if the signal on the first input terminal is higher than $U_{ref}$ and a "0" output signal if the signal on the first input terminal is less than $U_{ref}$.

The output terminals of the level detectors $5a$–$5h$ are connected to a diode matrix which, according to the exemplary embodiment, comprises eight input terminals $6a$–$6h$ and three output terminals $7a$–$7c$. The diode matrix is so constructed in a manner known per se and so connected via the input terminal $6a$–$6h$ to the respective level detectors $5a$–$5h$ that a "1" output signal at the output of detector $5a$ delivers a binary 000 signal to the output terminals $7a$–$7c$ of the diode matrix, while a "1" output signal at the output of detector $5h$ delivers a binary 111 signal to the output terminals $7a$–$7c$. "1" output signals at the outputs of respectively the level detectors $5b$–$5g$ deliver the intermediate binary signals to the output terminals $7a$–$7c$, thus, for example, the signal 101 for level detector $5f$.

In this manner it is possible with the detection system according to FIG. 1 to determine for each complete row which photosensitive element delivers a "1" signal via the associated level detector, which indicates that that element has received light. As a result, a matrix containing M rows and N columns can be read out in a cycle of M steps instead of in M×N steps in the hitherto known detection systems.

Although it is always possible to combine in a manner known per se the function of the photosensitive elements in the columns $2a$–$2h$ with the function of the associated shift register elements in the columns $3a$–$3h$, use is preferably made of the construction shown diagrammatically in FIG. 1 in which the photosensitive elements are separated from the shift registers because it has been found that the possibility of interference signals is lowest during the transfer of the charge with this configuration so that the most precise indication of the variation of the radiation profile line, which is indicated diagrammatically in FIG. 1 by line A, is obtained. It will be clear that the whole of the circuit shown in FIG. 1 is preferably integrated on one semiconductor substrate.

In order to suppress the effect of interfering ambient light as much as possible in profile line observation by means of the detection system according to the invention, use is preferably made of flashes of light in order to illuminate the profile to be observed in a fan shape, the photosensitive detection elements in the matrix being enabled by means of clock pulses to generate an output signal, which is proportional to the amount of light received, only during such flashes of light.

If specular reflections happen to occur, the quantity of charge in a photosensitive element may reach high values. In order to prevent charge overflowing from such a photosensitive element to an adjacently situated photosensitive element, anti-blooming electrodes are provided. As a result of this, the probability that more than one photosensitive element in one row delivers an output signal which is higher than $U_{ref}$ as a result of charge overflow is reduced.

If, for some reason, two or more photosensitive elements in one row deliver an output signal which is higher than $U_{ref}$ during the observation of a profile line, so that several level detectors 5 deliver a "1" output signal, this results in a completely incorrect measurement if no measures are taken against it.

A first possibility for eliminating such faults is shown in FIG. 1. For this purpose, one terminal of a series circuit of a diode, $8a$–$8h$ respectively, and a resistor, $9a$–$9h$ respectively is connected to each output terminal of the respective level detectors $5a$–$5h$, the other terminal of the series circuit always being connected to the corresponding terminal of the other series circuits and to a first input of a level detector 10. In this manner the output signals of the level detectors are summed and this summed signal is compared by level detector 10 with a second reference voltage $U_{2ref}$ which is equal to the "1" signal level. If several level detectors 5 deliver a "1" signal, level detector 10 also delivers a "1" signal, and this is then an indication of an incorrect measurement as a result of a "1" output signal of several level detectors for each single row.

If two photosensitive elements in one row deliver a "1" signal via the associated level detector 5, it is possible, according to a preferred embodiment of the invention, to convert it in an unambiguous manner into a reliable measurement signal with which it is possible, for example, to determine that the actual centre of gravity of the illumination of a row of photosensitive elements is situated between two such elements.

FIG. 2 shows diagrammatically the manner in which the diode matrix according to FIG. 1 should be extended in in order to make such a measurement possible. Only the diode matrix is shown because the structure of the matrix of photosensitive elements and the coupling thereof to the level detectors 5 is identical to that in the system according to FIG. 1.

The diode matrix now comprises six output terminals 7a–7f instead of three output terminals 7a–7c. The input terminals 6a–6h are connected in the same manner as in the embodiment according to FIG. 1 via the diodes of the diode matrix to the output terminals 7a–7c. The output terminals 7d–7f are, however, connected via diodes of the diode matrix to the input terminals 6a–6h in a manner such that the latter deliver an output signal which is complementary to the output signal on the terminals 7a–7c. Thus, the output terminals 7d–7f deliver a 000 binary signal if level detector 5h delivers a "1" output signal and a 111 signal if level detector 5a delivers a "1" output signal.

By way of example, it will be assumed that the level detectors 5b and 5e deliver a "1" output signal as a result of an observed radiation profile line. If only the output signal from the output terminals 7a–7c were to be used, a 100 binary signal would be obtained via level detector 5b and a 001 signal via level detector 5e, so that the total binary output signal on the terminals 7a–7c would be 101, and this would indicate that level detector 5f is delivering a "1" output signal. This is obviously a completely incorrect and unusable measurement result.

The output lines 7d–7f of the section of the diode matrix added in the embodiment according to FIG. 2 delivers, however, a 011 binary output signal for the "1" output signal of level detector 5b and a 110 signal for the "1" output signal of level detector 5e. The total output signal on the lines 7d–7f is the sum of these two signals, i.e. the 111 binary signal. This indicates that level detector 5a is delivering a "1" output signal, and this also constitutes an incorrect measurement result.

If, however, the binary output signal on the terminals 7a–7c and the binary output signal on the terminals 7d–7f are separately fed to a circuit 11 which is arranged so as to determine the average of said signals, then the output signal of circuit 11 is in fact found to reproduce precisely the geometrical centre between the column of photosensitive elements 2b and the column of photosensitive elements 2e in row 1a. For said average binary output signal indicates the position between the photosensitive elements 1c and 1d, and this is in fact the geometrical centre between the columns 2b and 2e.

By adding the binary codes on respectively the terminals 7a–7c and the terminals 7d–7f, a binary signal is obtained which reproduces this average plus one bit of additional information with which the position between two columns can therefore be indicated. By adding an additional diode matrix with three output terminals which delivers a binary output signal which is complementary to that on the terminals 7a–7c it is therefore possible to obtain reliable information relating to the centre between these two photosensitive elements if two photosensitive elements in a row are illuminated simultaneously.

If such an additional diode matrix according to FIG. 2 is provided, the reference voltage $U_{2ref}$ of the level detector 10 can be adjusted so that if the latter delivers only a fault signal if three or more photosensitive elements in one row deliver a "1" output signal via the associated level detector, because, by means of this additional diode matrix, such a multiple illumination does not result in a reliable measurement signal.

By making use of more complicated diode matrices and complex logic processing it is, however, in principle also possible to obtain a reliable output signal with three or more photosensitive elements in one row illuminated simultaneously.

Although an exemplary embodiment has been described above containing a number of rows of photosensitive elements, the principle on which the invention is based can be applied with the same advantage in the case of only one row of photosensitive elements. This entire row is then always read out in parallel by means of level detectors and a diode matrix. Such a detector can be used in a system for observing radiation profile lines of the type which is described in the European patent application 0,181,553, in which the profile to be observed is therefore illuminated not with a fan-shaped light beam but with a punctiform light beam and the radiation profile line is constructed from consecutive reflected light points. By means of the system according to the invention containing one row of photosensitive elements the read out frequency which can be achieved is just as high as in the system according to the said European patent application. However, a laser source with a high power is not necessary while in the event of the simultaneous illumination of two photosensitive elements in one row, a reliable output signal can nevertheless always be obtained if use is made of the extension of the diode matrix shown in FIG. 2.

Both in the case of one row and in the case of several rows of photosensitive elements it is possible with the system according to the invention to determine in a simple manner the actual level of that photosensitive element which is delivering a "1" output signal to the associated level detector. This is possible by always connecting a scanning line to the first input terminals of all level detectors via a normally opened switch, the switch being closed which belongs to the first input terminal of the level detector which delivers the "1" output signal, and this closure can take place under the control of the "1" output signal of the level detector concerned.

The level detectors 5a–5h and the reference voltage $U_{REF}$ together form level detector circuitry which is coupled to the Mth detection element of each column and has N outputs each corresponding to a respective column. The above described embodiment of such level detector circuitry, however, is not the only one possible. Another embodiment of level detector circuitry with N inputs and M outputs makes use of a so-called n-flop described in Scientific American 257 (1987) Dec. issue, pp. 62–70. By chosing the correct connecting network only one output signal will be driven to the "1" state while all other output signals will be driven to the "0" state. Such n-flop can be advantageously be integrated on the same chip as the photosensitive elements thus making a very compact detector. A further advantage is that no specific reference voltage level $U_{REF}$ has to be chosen in advance because the output signals of the Mth row are compared to one another only.

Finally, attention is drawn to the fact that the detection system according to the invention is not limited to use of CCDs. The principle is also applicable in the case of two-dimensional photodiode arrays, the photodiodes of which can be read out by x-ray addressing.

I claim:

1. A detection system for a radiation profile line which comprises:

a matrix-containing M rows (1a, ..., 1h) and N columns (2a, ..., 2h) of photosensitive detection elements;

means for shifting output signals of said detection elements under control clock signals and a read-out circuit having an input connected to an associated detection element, said read-out circuit comprising level detector circuitry, said shifting means shifting output signals of said detection elements row by row in a column direction, said input of said read-out circuit comprising said level detector circuitry, said level detector circuitry being coupled to an $M^{th}$ detection element of each column, said level detector having N outputs corresponding to a respective column, said outputs of said level detector circuitry being coupled to a circuit delivering a digital code representative of the position of an element in the $M^{th}$ row receiving the largest amount of light.

2. The detection system as defined in claim 1 wherein said circuit delivering a digital code is a diode matrix and wherein number of input signals to and output signals from said diode matrix correspond to bits necessary for binary coding said columns.

3. The detection system as defined In claim 2 wherein output signals of said level detector circuitry is connected to a second diode matrix having like number of input and output signals as said diode matrix, said second diode matrix delivering a binary output signal complimentary to output signals of said diode matrix.

4. The detection system as defined in claim 3 and further including means for determining an average between a binary output signal of said diode matrix and a binary output signal of said second diode matrix.

5. The detection system as defined in claim 1 wherein said level detector circuitry comprises an n-flop.

6. The detection system as defined in claim 1 wherein said level detector circuitry comprises a level detector for each column.

7. The detection system as defined in claim 6 and further including means for summing output signals of all level detectors and a further level detector for comparing summed signals with a reference voltage.

8. The detection system as defined in claim 7 wherein said reference voltage is virtually equal to a highest output signal of said level detectors connected to said columns.

9. The detection system as defined in one of claims 1 to 8 wherein the number of rows is equal to one.

* * * * *